PARAMETRON ELEMENT USING FERRO-MAGNETIC THIN FILM

Filed Dec. 11, 1961 6 Sheets-Sheet 1

Fig. 5
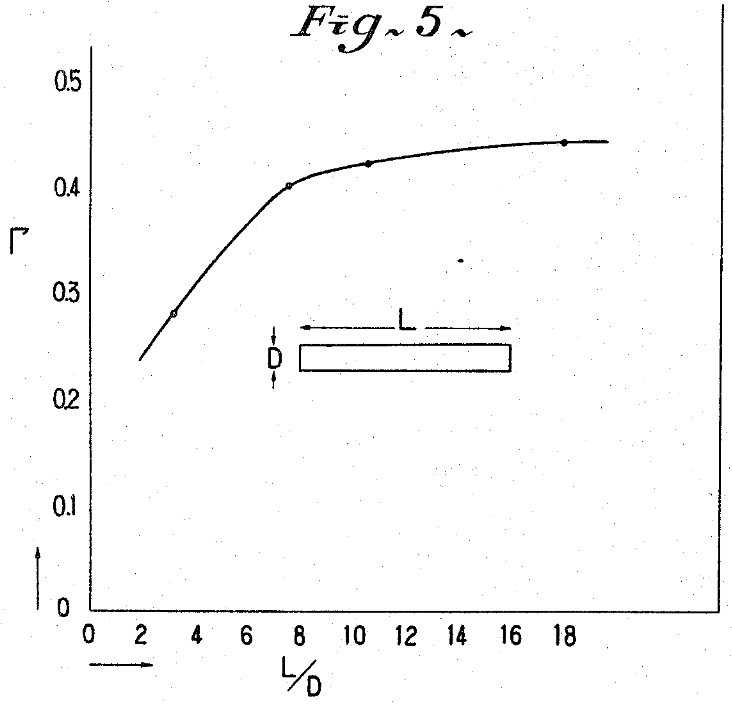
Fig. 6(A) Fig. 6(B) Fig. 6(C)
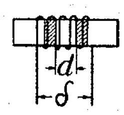
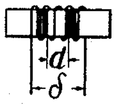
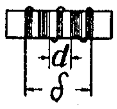
Fig. 6(D)
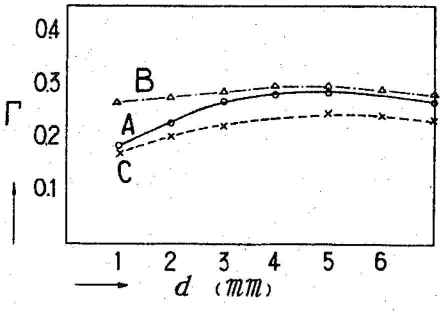

PARAMETRON ELEMENT USING FERRO-MAGNETIC THIN FILM

Filed Dec. 11, 1961 6 Sheets-Sheet 4

3,381,138

PARAMETRON ELEMENT USING FERRO-MAGNETIC THIN FILM

Shintaro Oshima, Mushashino-shi, Hajime Enomoto, Ichikawa-shi, Kakuo Futami and Toshihiko Kobayashi, Mitaka-shi, Tetsusaburo Kamibayashi, Shinza-machi, Takasuke Fukui and Akira Okada, Tokyo-to, Makoto Saheki and Haruo Koyama, Sendai-shi, Makoto Saito, Tokyo-to, Tokuhisa Moriyama, Sendai-shi, Kohei Abe, Shiogama-shi, and Sachio Saito, Sendai-shi, Japan, assignors to Kokusai Denshin Denwa Kabushiki Kaisha, Tokyo-to, Japan, a joint-stock company of Japan Filed Dec. 11, 1961, Ser. No. 158,290
Claims priority, application Japan, Dec. 20, 1960, 35/49,297, 35/49,298; Dec. 21, 1960, 35/49,438; Feb. 27, 1961, 36/6,054
3 Claims. (Cl. 307—88)

The present invention relates to improved parametron elements of the ferro-magnetic thin film core type and more particularly to a novel parametron element wherein an exciting winding and an oscillation winding are wound on a ferro-magnetic thin film core so that their winding axes are disposed in the same direction, the magnetic path of the ferro-magnetic thin film core being open in both the exciting magnetic field and oscillating magnetic field, and the length of the core in the direction of the exciting magnetic field being made to be sufficiently longer than the thickness of the thin film forming the core, whereby the parametron element is made to be operable with low electric power, at high speed, and to be easily applicable to miniaturization and mass production.

Heretofore, the so-called parametron element has been broadly used as a circuit element of apparatus such as an electric computer, an electronic exchange equipment, a device of an ARQ telegraphing terminal equipment, and the like. However, in the conventional parametron element, a ferrite core or cores are used, so that operation speed and miniaturization of the element are limited, a relatively large electric power is consumed, winding process of the windings is troublesome because of use of a magnetic core which forms a closed magnetic path in the direction of exciting magnetic field, and the element is not suitable for mass production. Moreover, since the Curie-temperature of the ferrite core is relatively low, the element is limited in its use by the temperature to which it is exposed.

It is an essential object of the present invention to provide a new and improved parametron element having none of the above-mentioned disadvantages of the conventional parametron elements.

The above object and other objects have been attained by an improved element, wherein is used as the magnetic core at least one ferro-magnetic thin film core the length of which in the direction of the exciting magnetic field is sufficiently longer in comparison with thickness of the thin film, said oscillation winding is wound closely on the approximate center portion of the magnetic core so as to be concentrated within a narrow coil width, and an exciting winding is wound on the magnetic core with uniform distribution so as to have the same winding axis as that of the oscillation winding, whereby the exciting magnetic field produced by an electric current passing through the exciting winding is made to be a uniform field and to be parallel to the oscillation magnetic field produced by an oscillation current passing through the oscillation winding, and the magnetic path of the ferro-magnetic thin film core is made to be in an open state in the direction of the exciting field and oscillation magnetic field.

The details of the invention and its principle as well as the manner in which the objects and advantages of the present invention may best be achieved will be understood more fully from a consideration of the following description, taken in conjunction with the accompanying drawings, in which the same or equivalent parts are designated by the same reference numerals or letters, and the relative dimensions of various parts are made to differ somewhat from actual dimensions in order to make explanation of the example of the present invention more understandable, and in which:

FIG. 5 is a characteristic curve showing the relation between the ratio of width D and length L of a ferro-magnetic thin film core of FIG. 4 and a parametric oscillation factor Γ;

Figure 4:
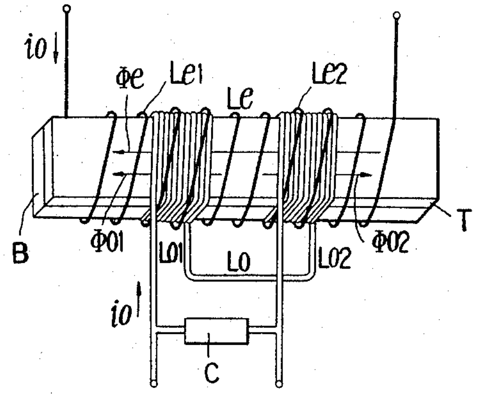
FIG. 4 is a schematic, perspective view of a representative example of the present invention, wherein only one ferro-magnetic thin film core of oblong type is used.
Figures 7, 8, 9, 10A, 10B, 11:
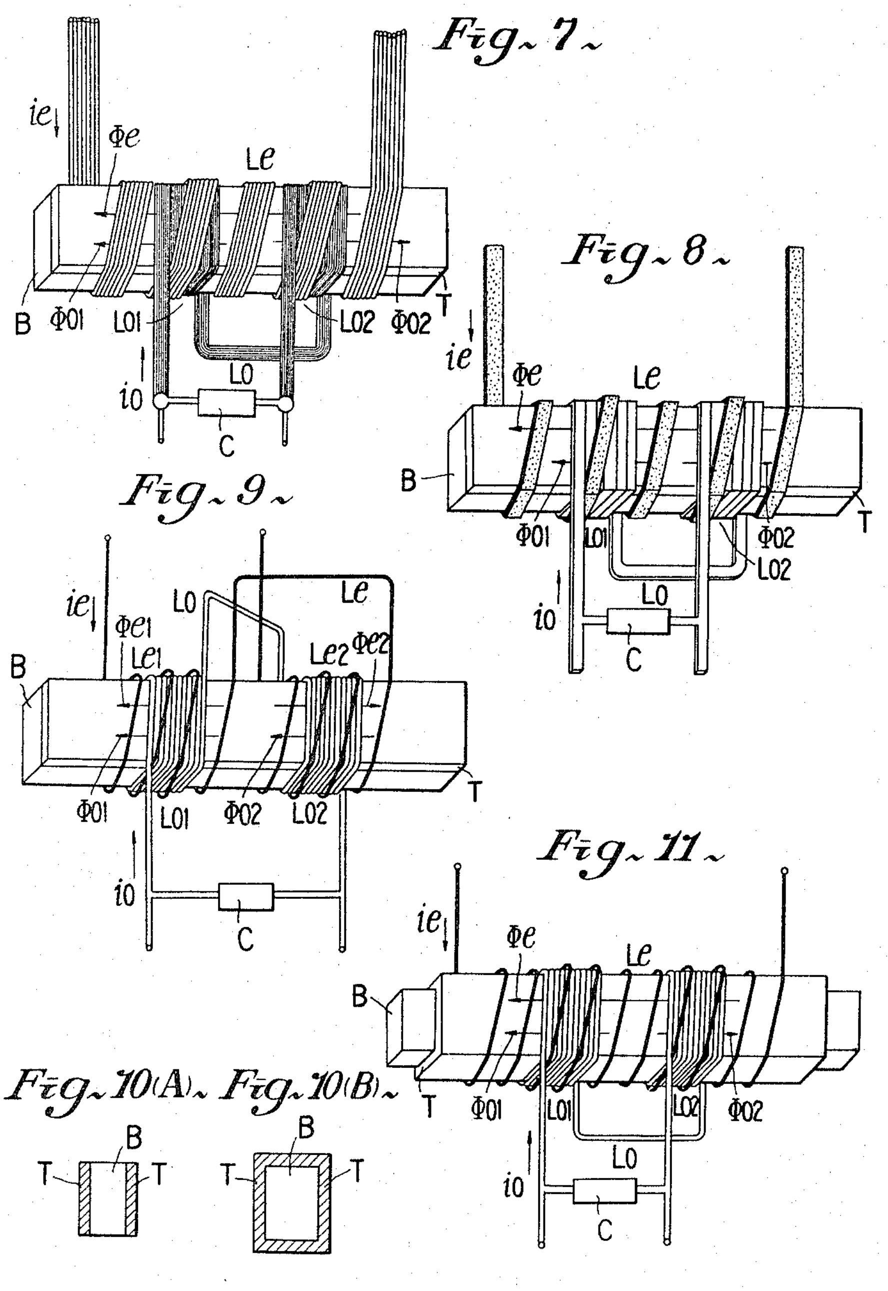
Figure 12A:
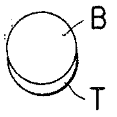
Figure 12B:
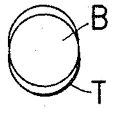
Figure 12C:
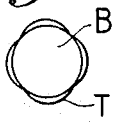
Figure 12D:
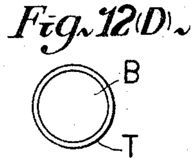
Figure 13:
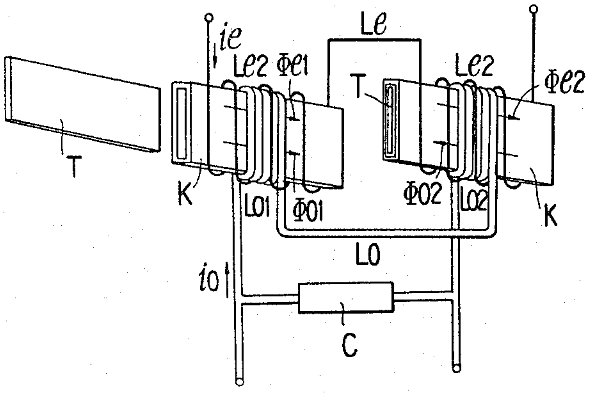
Figure 14A:
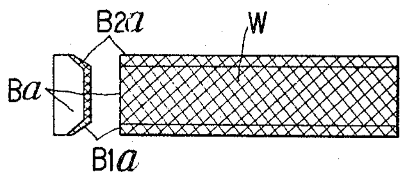
Figure 14B:
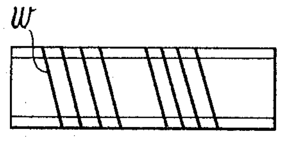
Figure 14C:
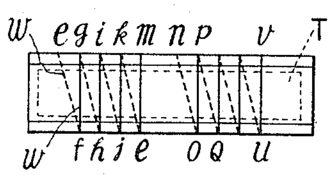
Figure 14D:
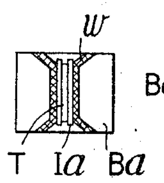
Figure 14E:
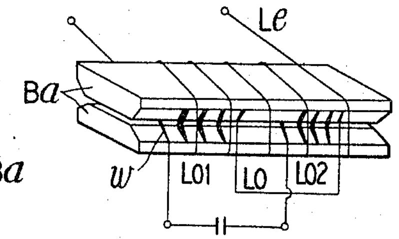
Figure 15A:
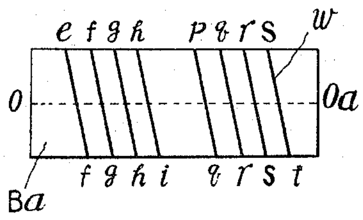
Figure 15B:
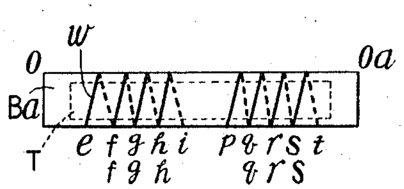
Figure 16:
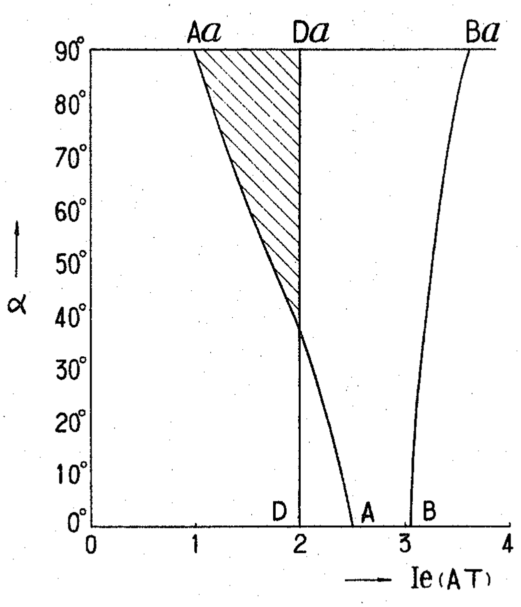

FIGS. 6(A), 6(B) and 6(C) are chematic views showing different manners of winding process in which the exciting winding and oscillation winding of the element of FIG. 4 are wound;

FIG. 6(D) are characteristic curves for showing the relations between the space $d$ between two oscillation coils and the parametric oscillation factor Γ;

FIG. 7 is a schematic, perspective view of an example of the present invention, wherein split windings are used as the exciting and oscillation windings;

FIG. 8 is a schematic, perspective view of an example of the present invention, wherein strip wires are used as the exciting and oscillation windings;

FIG. 9 is a schematic, perspective view of an example of the present invention, wherein each of the exciting winding and oscillation winding consists of two coils, and the directions of the exciting magnetic fields of the two exciting coils are made opposite to each other;

FIG. 10(A) is a sectional view of a ferro-magnetic thin-film core consisting of a plate-shaped substratum and a ferro-magnetic thin film deposited on both surfaces of the said substratum;

FIG. 10(B) is a sectional view of a bar-shaped magnetic core consisting of a bar-shaped substratum and a ferro-magnetic thin film deposited around the said substratum;

FIG. 11 is a schematic, perspective view showing an example of the present invention, wherein a bar-shaped magnetic core having a rectangular section is used;

FIGS. 12(A), (B), (C) and (D) are sectional views showing, respectively, different states of a ferro-magnetic thin film which is deposited on a substrata having a circular section;

FIG. 13 is a schematic, perspective view showing an example of the present invention, wherein a ferro-magnetic, exfoliated thin film itself is used as a core;

FIGS. 14(A), (B), (C) and (D) are schematic views for describing the manners in which an oscillation winding is formed by evaporative depositing, and FIG. 14(E) is a perspective view of the element which is formed in the manners of FIGS. 14(A), (B), (C), and (D);

FIGS. 15(A) and FIG. 15(B) are schematic views for showing another different manner of forming the oscillation winding by evaporative depositing; and FIG. 16 is oscillating characteristic curves of the parametron element of the present invention, said curves being represented by use of two parameters which are exciting current $I_e$ the angle $\alpha$ of an easy magnetization axis of the magnetic core.

Prior to description of the parametron element of this invention, conventional parametron elements will be briefly described.

Figure 1A:
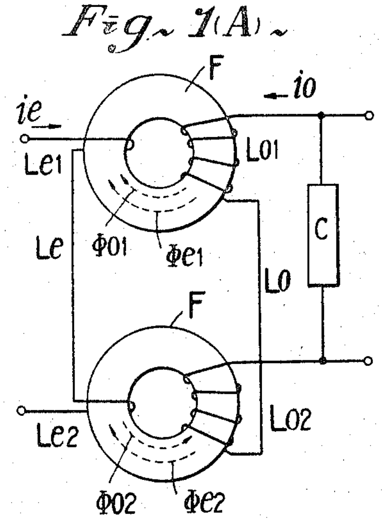
FIG. 1(A) is a schematic of a standard construction of a conventional parametron element which uses ferrite cores.
Figure 1B:
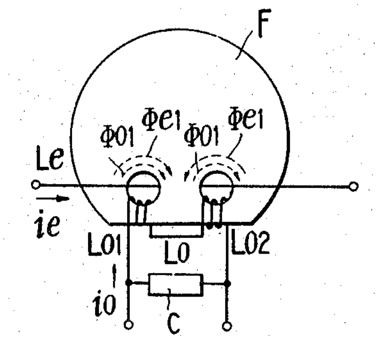
FIG. 1(B) is a schematic of a conventional parametron element which uses an eye-glass type ferrite core.

The most general, conventional parametron element has a construction, wherein, as shown in FIG. 1(A), two ferrite magnetic cores are used, and on these cores are wound exciting coils $L_{e1}$, $L_{e2}$ and oscillation coils $L_{o1}$, $L_{o2}$, or, as shown in FIG. 1(B), one ferrite magnetic core is used, and on this core are wound an exciting winding $L_e$ and an oscillation winding $L_o$ consisting of two oscillation coils $L_{o1}$, $L_{o2}$. The coils are wound in such a manner that the magnetic cores or core form closed magnetic paths with respect to the magnetic fluxes $\Phi_{e1}$ and $\Phi_{e2}$ produced by an electric current $i_e$ passing through the exciting winding and to the magnetic fluxes $\Phi_{o1}$ and $\Phi_{o2}$ produced by an electric current $i_o$ passing through the oscillation winding, and to the oscillation winding consisting of the oscillation coils $L_{o1}$ and $L_{o2}$ is connected in parallel a tuning condenser C which is adapted to resonate with a frequency $f$ which is ½ of the excitation frequency $2f$ of the exciting winding. However, the parametron element such as that described above has disadvantages in that operation speed and miniaturization are limited within certain limits, a relatively large electric power is consumed, and its winding technique and working thereof are troublesome, thus making the element unsuitable for mass production.

Figure 2A:
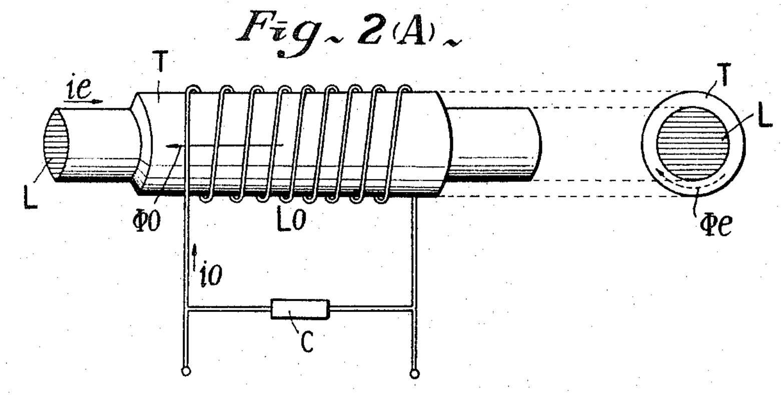
FIG. 2(A) is a schematic of a conventional parametron element utilizing magnetic field of the cross type.
Figure 2B:
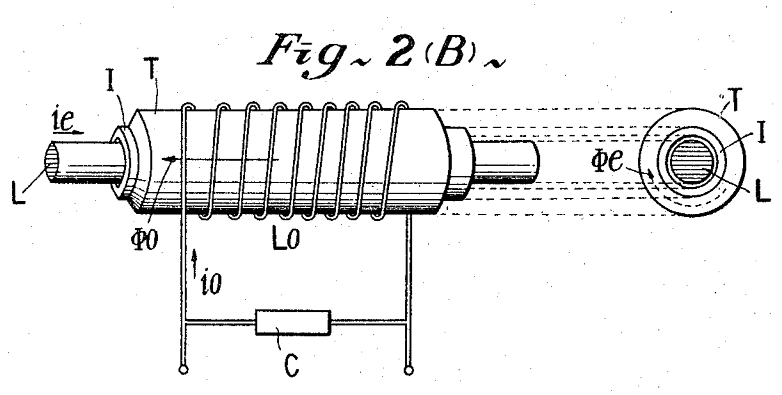
FIG. 2(B) is a schematic showing the construction of a conventional parametron element utilizing a magnetic field of the cross type, wherein a magnetic core consisting of an electrically insulating tube and a ferro-magnetic thin film deposited on the tube are used, and an exciting conductor is made to pass through the tube.
Figures 2C, 3A:
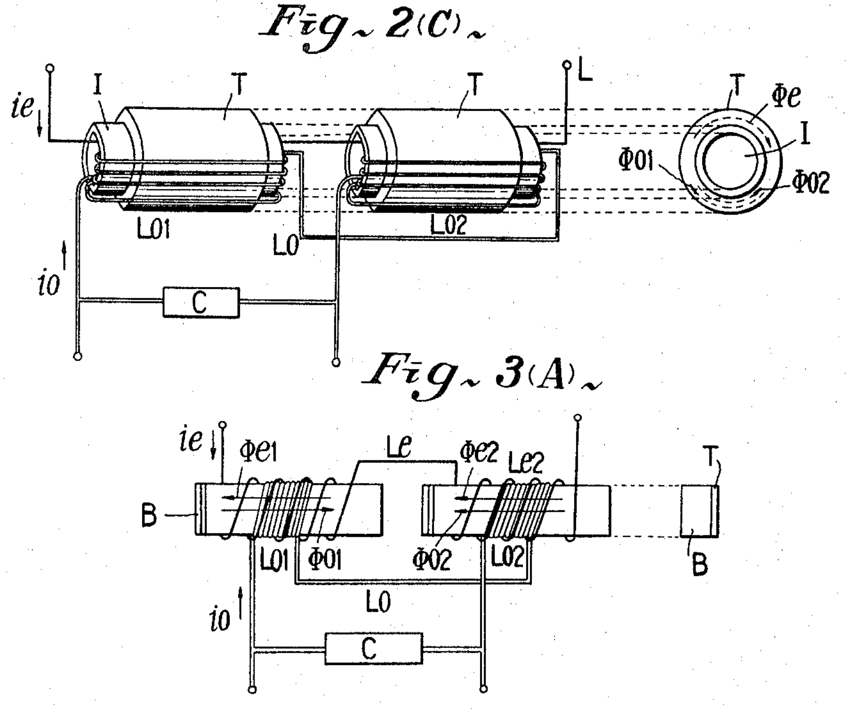
FIG. 2(C) is a schematic, perspective view showing the construction of a conventional parametron element, wherein two magnetic cores, each consisting of an electrically insulating tube and a ferro-magnetic thin film deposited on a tube, are used, and an exciting conductor is made to pass through each of the tubes illustrated.
FIG. 3(A) is a schematic of a representative example of the present invention, wherein two ferro-magnetic thin film cores of oblong type are used.

On the other hand, a ferro-magnetic thin film core has been recently proposed as the magnetic core of the so-called parametron element, for example, there is a parametron element which is constructed, as shown in FIG. 2(A), by depositing a ferro-magnetic thin film T on the surface of an electric conductor L by evaporative depositing or electric depositing, the conductor L is directly supplied with an exciting current $i_e$, and by winding an oscillation winding $L_o$ around the said thin film T. Another example is a parametron element which is constructed, as shown in FIG. 2(B), by depositing a ferro-magnetic thin film T on the surface of an electrically insulating tube I, and by winding oscillation coils $L_{o1}$ and $L_{o2}$ around the deposited thin film. A further example is a parametron element which is constructed, as shown in FIG. 2(C), by winding each of the oscillation coils $L_{o1}$ and $L_{o2}$ composing an oscillation winding around the wall of an electrically insulating tube I in the axial direction thereof, one half of each winding turn being along an external element of the tube I and the other half passing through the interior of the said tube I, and by passing an electric conductor L through the interior of the said tube I, the conducor L being supplied with an exciting current $i_e$. The parametron elements illustrated in FIGS. 2(A) and 2(B) relate to the so-called crossed type parametron element wherein the ferro-magnetic thin film T forms a closed magnetic path with respect to the magnetic flux $\Phi_e$ produced by the exciting current $i_e$, and the magnetic flux $\Phi_o$ produced by an oscillation current $i_o$ crosses the magnetic flux $\Phi_e$ in the surface of the thin film. The parametron element of FIG. 2(C) relates to an element, wherein an oscillation magnetic flux $\Phi_o$ and an exciting magnetic flux $\Phi_e$ are parallel in the surface of the ferro-magnetic thin film T, and this thin film forms a closed magnetic path with respect to both magnetic fluxes $\Phi_o$ and $\Phi_e$.

In all of the elements of FIGS. 2(A), 2(B) and 2(C), since a ferro-magnetic thin film core is used as a non-linear element, the elements can operate with low electric power, at high speed, and moreover can be miniaturized. However, in the case of deposition of a ferro-magnetic thin film on a tube by evaportive depositing, the making thereof is very troublesome, and the quality of the magnetic thin film is liable to become non-uniform because the evaporative depositing must be carried out while the substratum is being rotated. Furthermore, in the element of FIG. 2(A), since the substratum to be deposited with a ferro-magnetic thin film acts as a conductor to be supplied with an exciting current, the material of the substratum presents a difficult problem. In the element of FIG. 2(B), it is necessary to make an exciting conductor pass through the interior of the insulating tube, and in the element of FIG. 2(C), the oscillation winding also must be wound while being passed through the tube-shaped magnetic core, whereby manufacturing of the parametron elements of these examples is made very difficult.

The above-mentioned various disadvantages have been eliminated by the present invention. The present invention will be described in connection with various examples in the following disclosure.

FIG. 3(A) relates to one example of the present invention, wherein two magnetic cores, each consisting of an oblong plate-shaped substratum B and a ferro-magnetic thin film T deposited on the said substratum, are used as one set; an oscillation widing $L_o$ consisting of two oscillation coils $L_{o1}$ and $L_{o2}$ and an exciting winding $L_e$ consisting of two exciting coils $L_{e1}$ and $L_{e2}$ are wound on the cores on the same winding axis so that the magnetic fluxes $\Phi_{o1}$ and $\Phi_{e1}$ produced by the electric currents passing, respectively, through the coils $L_{o1}$ and $L_{e1}$ are parallel to each other, and moreover the magnetic fluxes $\Phi_{o2}$ and $\Phi_{e2}$ produced by the electric currents passing, respectively, through the coils $L_{o2}$ and $L_{e2}$ are parallel to each other; and a tuning condenser C is connected in parallel to the oscillation winding $L_o$. In the parametron element of FIG. 3(A), the length of the core is made to be sufficiently longer in the direction of the exciting magnetic field than the thickness of the ferro-magnetic thin film T in order to hinder the production of leakage flux at the setting position of the winding, the oscillation coils $L_{o1}$ and $L_{o2}$ are concentrically wound so as to decrease the inductance of the spatial gap between the thin film T and windings and to increase the parametric excitation factor Γ, and the excitation coils $L_{e1}$ and $L_{e2}$ are wound around the oscillation coils so as to make the exciting magnetic field uniform, whereby the magnetic fields produced by the exciting currents is made to pass through the excitation winding.

In the above-mentioned magnetic core of an open magnetic path type, it appears that effective variation of the magnetic flux is very difficult, and therefore the parametric excitation factor Γ is small. However, as described already, when the length of the ferro-magnetic thin film core is made to be sufficiently longer in the direction of the exciting magnetic field than the thickness of the thin film, the oscillation winding is made to be sufficiently close to the magnetic core to produce no leakage flux at its winding part, and moreover the oscillation winding is concentrically wound, the ferro-magnetic thin film T becomes equivalent to a magnetic body having infinite length, whereby the magnetic flux varies in the same manner as in the case of a closed magnetic path in spite of the fact that the magnetic path of the core assumes an open state in the direction of the exciting magnetic field, thus enabling manufacture of an excellent parametron element having a sufficiently large parametric excitation factor Γ.

Accordingly, his parametron element can operate with low electric power, at high speed. Moreover, the substrata B adapted to deposition of a thin film by evaporative depositing or electric depositing is not used as an electric conductor for passing therethrough an exciting current, so that selection of the material forming the substrata is optional. Particularly, since it is necesasry only to deposit a thin film on a plate-shaped substrata, manufacturing of the core is very simple even when the thin film is to be deposited by evaporative depositing, whereby a ferro-magnetic thin film core having uniform quality and excellent characteristics can be obtained. In the winding process of the windings, oscillation coils and excitation coils can be easily wound around an oblong core without necessitating passing of the coils through a hollow substratum. Accordingly, very small parametron elements having uniform characteristics can be obtained by mass production.

Figure 3B:
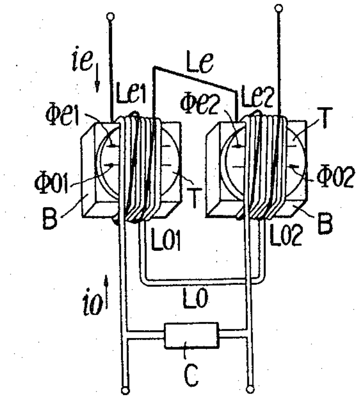
FIG. 3(B) is schematic, perspective view of an example of the present invention, wherein two ferro-magnetic thin film cores having a thin film of circular section are used.

A parametron element having characteristics which are almost the same as those of the element of FIG. 3(A) can be obtained by use of such a ferro-magnetic thin film having a circular section as shown in FIG. 3(B). In the element of FIG. 3(B), the oscillation coils $L_{o1}$, $L_{o2}$ and excitation coils $L_{e1}$, $L_{e2}$ must be set so that each of them is symmetrical on the right and left sides with respect to the diameter of the circular thin film. The other features of the element of FIG. 3(B) are the same as those of the element of FIG. 3(A). Of course, a parametron element having the same characteristics as those of the element of FIG. 3(B) can be obtained by use of a ferro-magnetic thin film having an elliptic section as the ferro-magnetic thin film of the magnetic core.

In FIG. 4 is shown a parametron element of the present invention, wherein only one ferro-magnetic thin film core is used, the core is equivalent to the combination of the two cores in the element of FIG. 3(B). In FIG. 4, oscillation coil $L_{o1}$ and $L_{o2}$ are wound around one ferro-magnetic thin film core consisting of a bar-shaped substrata B and a ferro-magnetic thin film T so that they are separated at the central portion of the core, the coils are close to the core, and each of the coils is concentrically wound. The winding directions of the coils $L_{o1}$ and $L_{o2}$ are selected so that the magnetic fluxes $\Phi_{o1}$ and $\Phi_{o2}$ produced by an oscillation current passing through the coils are opposite to each other. A tuning condenser C is connected in parallel to the oscillation winding $L_o$ consisting of two oscillation coils $L_{e1}$ and $L_{e2}$; and then an exciting winding $L_e$ is uniformly wound on the oscillation winding and core. The element of FIG. 4 is effective from its manufacturing and utilization points of view because a parametron element having excellent characteristics can be obtained by use of only one core.

In the following disclosure, characteristics of the parametron elements of the present invention will be described. In FIG. 5 is shown a characteristic curve showing the relation between a ratio $L/D$ and a parametric excitation factor $\Gamma$, where L and D are, respectively, the length and width of the core. The characteristic curve of FIG. 5 corresponds to the core, wherein the number of turns of each of the oscillation coils $L_{o1}$, $L_{o2}$ and the excitation winding $L_e$ and the space distance between the coils $L_{o1}$ and $L_{o2}$ are made to be constant. As will be understood from the characteristic curve of FIG. 5, a parametric excitation factor $\Gamma$ exists within a practicable range when the ratio $L/D$ exceeds about 3, and this factor does not vary appreciably when the ratio $L/D$ exceeds about 8.

In FIG. 6(D) are shown characteristic curves indicating the relation between the manner of winding process of the oscillation coils $L_{o1}$, $L_{o2}$ and the excitation winding $L_e$ and the parametric excitation factor $\Gamma$. The characteristic curves A, B and C of FIG. 6(D) relate to the case wherein the form and dimension of the magnetic core and coil width $\delta$ of the excitation winding $L_e$ are made to be constant, and the variation of the parametric excitation factor $\Gamma$ is plotted in accordance with the variation of the distance $d$ between the oscillation coils $L_{o1}$ and $L_{o2}$, the curves A, B and C corresponding, respectively, to the following three cases.

(A) Exciting winding $L_e$ is a uniformly distributed solenoid, and oscillation coils $L_{o1}$ and $L_{o2}$ are a multilayer winding.

(B) Exciting winding $L_e$ is a uniformly distributed solenoid, and oscillation coils $L_{o1}$ and $L_{o2}$ are a concentrically wound solenoid.

(C) Exciting winding $L_e$ is a concentrically wound solenoid, and oscillation coils $L_{o1}$ and $L_{o2}$ are a concentrically wound solenoid.

In the case of (B), the variation of the parametric excitation factor $\Gamma$ due to variation of coil width $d$ is a minimum, so that the element can be miniaturized by use of such a winding manner as shown in FIG. 6(B).

On the basis of the above character, in the parametron element of this invention, oscillation coils $L_{o1}$ and $L_{o2}$ are concentrated within a narrow width, and on said coils is wound the exciting winding $L_e$ as a uniformly distributed solenoid. Although the following examples include one magnetic core or two magnetic cores, the explanation relates to only the case wherein only one magnetic core is used.

As the wire forming the windings, a single wire is generally used, but when the number of turns of the oscillation coils is limited as in the case in which a high frequency is used, it is difficult to wind a single wire in a sufficiently concentrated state. Therefore, several wires are wound in a parallel state as shown in FIG. 7 or a strip wire which is equivalent to a closely wound concentrated coil is used as shown in FIG. 8. In order to increase the parametric excitation factor $\Gamma$, it is necessary only to make the exciting winding produce a uniform exciting magnetic field which is parallel to the magnetic fluxes $\Phi_{o1}$ and $\Phi_{o2}$ produced by an oscillation current $i_o$; so that use of a concentratedly wound exciting winding is not necessary, but when a split winding or strip wire is used, a more effective result is expected.

The method of winding and connecting the oscillation winding and exciting winding will be described below.

In the above-mentioned examples of the present invention, the oscillation winding $L_o$ is formed by connecting the oscillation coils $L_{o1}$ and $L_{o2}$ in such a manner that the oscillation magnetic fluxes $\Phi_{o1}$ and $\Phi_{o2}$ produced by an oscillation current $i_o$ are opposite to each other, and accordingly the exciting winding $L_e$ consisting of only one coil is necessary. However, when, as shown in FIG. 9, two coils of the oscillation winding $L_o$ are connected so that the above-mentioned magnetic fluxes $\Phi_{o1}$ and $\Phi_{o2}$ have the same direction, and the exciting wind- $L_e$ is formed by connecting two exciting coils $L_{e1}$ and $L_{e2}$ so that the magnetic fluxes $\Phi_{e1}$ and $\Phi_{e2}$ produced by an exciting current $i_e$ passing through the said coils are opposite to each other, a parametron element having the same characteristics as that of FIG. 8 is obtained.

The above examples relates to the case in which a magnetic core having a ferro-magnetic thin film which is deposited on only one surface of a plate-shaped substrata is used. However, when a magnetic core having a ferro-magnetic thin film T deposited, as shown in FIG. 10(A), on both surfaces of a plate-shaped substratum B or, as shown in FIG. 10(B), on all side surfaces of a bar-shaped substratum B is used, and an oscillation winding $L_o$ and an exciting winding $L_e$ are wound on the core in the same manner as in the case of FIG. 4, a parametron element having the same characteristics is obtained. An actual example of the case of FIG. 10(B) is shown in FIG. 11. According to the example of FIG. 11, since the oscillation coils $L_{o1}$ and $L_{o2}$ forming an oscillation winding $L_o$ can be made to be affixed more closely to the ferro-magnetic thin film T, a parametron element having a larger parametric excitation factor $\Gamma$ and a good efficiency with respect to the exciting power is obtained. The section of the bar-shaped substratum may be of circular, rectangular or any other form. Various sections of the magnetic cores, each consisting of a bar-shaped substratum B having a circular section and a ferro-magnetic thin film T deposited on the said substratum are shown in FIGS. 12(A), (B), (C) and (D).

In FIG. 13 is shown an example of the present invention wherein stripped thin films are used as the thin films of the cores. A stripped thin film can be prepared by depositing the ferro-magnetic thin film on its substrata by any method such as evaporative depositing and then by stripping off the thin film from its substrata or by dissolving out the substrata itself. In the parametron element of FIG. 13, oscillation coils $L_{o1}$ and $L_{o2}$ forming an oscillation winding $L_o$ and exciting coils $L_{e1}$ and $L_{e2}$ forming an exciting winding $L_e$ are previously wound on a hollow frame *k* having a form and dimension adapted to make a previously prepared stripped thin film enter therein and then the said thin film T is fitted into said frame *k*. The element of FIG. 13 relates to the case wherein two cores are used, but in the case of one core, the same element can be manufactured. In the element of FIG. 13, when the space in the frame *k* is made to be as small as possible by use of a very thin layer such as a mica layer for the frame, the parametric excitation factor Γ can be made very large, whereby a parametron element having characteristics can be obtained.

In the embodying of the present invention, the oscillation winding can be formed by evaporative depositing. The method of forming such an oscillation winding as described above is shown in FIGS. 14(A), (B), (C) and (D).

(a) At first, as shown in FIG. 14(A), both edges $B_{1a}$ and $B_{2a}$ of a flat insulating substratum $B_a$ made of glass or ceramic are cut off, and then an electroconductive film W of copper or aluminum is deposited on the said substratum by evaporative depositing or printing.

(b) As shown in FIG. 14(B), the film W is dissolved out by a photo-etching method except the part corresponding to the wire *w*. In this treatment, the surface of the wire *w* is previously covered by an etching-resistive film I*a* as shown in FIG. 14(D), and then the film I*a* is stripped off at the edges $B_{1a}$ and $B_{2a}$.

(c) Then, as shown in FIGS. 14(C) and (D), a ferro-magnetic thin film T is so clamped between two substratas that the two substrata face each other at their surfaces having the deposited wires *w*, and the ends of both wires *w* are superimposed.

(d) The superimposed ends *f, g, . . . l* and *o, p, . . . u* are made to adhere by an electroconductive bonding agent or solder, whereby the wires *w* deposited on both substrata are established as coils the terminals of which are, respectively, (*e, m*) and (*n, v*).

(e) Accordingly, as shown in FIG. 14(E), by connecting lead wires to the terminals *e, m, n,* and *v* so as to form an oscillation winding $L_o$, and by winding a uniformly distributed exciting winding $L_e$ around the substratum $B_a$, a parametron element can be easily obtained.

In the case of this example the above-mentioned oscillation winding $L_o$ consisting of two coils $L_{o1}$ and $L_{o2}$ can be formed by the method such as shown in FIGS. 15(A) and (B). As shown in FIG. 15(A), the wire *w* is deposited, in the same manner as in the case of FIG. 14(B), on a substratum $B_a$ capable of being folded along a center line $o$–$o_a$, then this substratum is folded along the said line $o$–$o_a$ so as to clamp a ferro-magnetic thin film T therebetween, whereupon a parametron element can be obtained as in the case of FIGS. 14(C), (D) and (E).

By the other method of manufacturing an oscillation winding, a mask having thin slits is put on a substratum, an electro-conductive material such as copper is deposited on the said mask by evaporative depositing so as to obtain the form shown in FIG. 14(B), an electrically insulating film made of $SiO_2$ or MgF is deposited on the said deposited conductor by evaporative depositing, a ferro-magnetic thin film T is deposited on the said insulating film by evaporative depositing so as to obtain a form such as that shown in FIG. 14(C), the insulating film is again deposited on the said thin film T by evaporative depositing, and then an electroconductive thin wire *w* is formed again so as to obtain the form of FIG. 14(C), whereby a desirable oscillation winding can be manufactured. Further treatments necessary for manufacturing a parametron element are the same as those of the case of FIG. 14(E). According to this method, a desirable exciting winding can be manufactured also by evaporative depositing. According to this example, since an oscillation winding can be set so as to be very close to both surfaces of a ferro-magnetic thin film, whereby the space portion is greatly decreased, a parametron element having a large parametric oscillation factor Γ and excellent characteristics can be obtained.

Finally, a parametron element utilizing a ferro-magnetic thin film core having an easy magnetization axis will be described below.

A ferro-magnetic thin film having an easily magnetizable axis which is substantially parallel to the direction of the exciting magnetic field can be easily magnetized and also has an ideal, rectangular hysteresis loop characteristic. Accordingly, when a ferro-magnetic thin film is used for the magnetic core of a parametron element, a so-called parametric excitation cannot be attained unless an excitation along the so-called Major Loop is achieved. Accordingly, the hysteresis loss corresponding to the total area of the hysteresis loop dissipates a large quantity of exciting electric power, thus necessitating a relatively large exciting power. On the other hand, as is well-known, the inclination of a hysteresis loop can be varied by applying another magnetic field in a direction differing, by a certain angle, from the direction of the exciting magnetic field or by imparting a proper, easy magnetization axis to the core. The exciting power of the parametron element of this invention can be decreased by utilizing the above mentioned phenomenon.

In FIG. 16 is shown oscillating characteristic curves of the parametron of the present invention, the curves being represented by use of two parameters which are the exciting current $I_e$ (abscissa) and the angle (ordinate) between the direction of the exciting magnetic field and the easy magnetization axis of the core while a bias current $I_{DC}$ is maintained constant. In FIG. 16, the start point and stop point of the oscillation in the case of variation of the exciting current $I_e$ is shown, respectively, by lines A–A*a* and B–B*a*. As will be understood from FIG. 16, the region defined by the lines A–A*a* and B–B*a* is the oscillation zone of the parametron element. Since in the region (Shaded zone) defined by the lines D–D*a* and A–A*a*, the exciting current $I_e$ is smaller than the bias current $I_{DC}$, the excitation loop describes a minor loop in the first quadrant of the hysteresis loop, whereby the exciting power is greatly decreased. That is, for decreasing the exciting power of a parametron element of ferro-magnetic thin-film type, the most effective method is to maintain the angle between the direction of exciting magnetic field and the easily-magnetizable axis at a value between 40° and 90° as shown in FIG. 16.

As described above in connection with various examples of the present invention, the parametron element according to this invention, inspite of their utilization of magnetic cores or core the magnetic path of which is made to be in an open state in the directions of exciting magnetic field and oscillation magnetic field, have an effect equivalent to that in the case wherein the magnetic path of the core is in a substantially closed state in the directions of the exciting and oscillation magnetic field. Moreover, since effective techniques for manufacturing the magnetic thin film are used, each of the parametron elements according to this invention becomes very small in its form and simple in its construction and manufacture and can be operated with low electric power, at high speed, and is suitable for mass production. Since it is obvious that many changes and modifications can be made in the above-described details without departing from the nature and spirit of the invention, it is to be understood that the invention is not to be limited to the details described herein except as set forth in the appended claims.

What we claim is:

1. A parametron element comprising, a ferromagnetic thin film core, hard protection means holding said core, an exciting winding consisting of two exciting coils wound on the core separately and connected, in series in a reverse sense for exciting the core with a frequency $2f$, an oscillation winding consisting of two oscillation coils closely wound, respectively, on the core adjacently at the center portion of the core so as to have narrow winding widths and connected in series so that said two windings are decoupled to each other, said exciting winding and said oscillation winding having the same winding axis, a resonant circuit comprising said oscillation winding and a tuning capacitor connected in parallel with the oscillation winding to resonate with a frequency $f$, the magnetic path being not closed in the core with respect to magnetic fluxes produced by both currents flowing through said two windings, means to apply a weak input signal to said resonant circuit and having one of two opposite phases, whereby an oscillation signal is induced in said resonant circuit composed of said oscillation winding and said tuning capacitor, said oscillation signal having the frequency $f$ and one of two possible phases which differ by 180° in accordance with the phase of said input weak signal applied to said resonant circuit.

2. A parametron element comprising, two ferromagnetic thin film cores defining a magnetic path, hard protection means holding the respective film cores, an exciting winding consisting of two exciting coils wound respectively on the cores and connected in series for uniformly exciting the cores with the frequency $2f$, and oscillation winding consisting of two oscillation coils closely wound, respectively, on the core convergently at the center portion of the core so as to have narrow winding width and the same winding axes as those of the exciting coils and connected, in series, so that said two windings are decoupled to each other, a resonant circuit comprising said oscillation winding and a tuning capacitor connected in parallel with the oscillation winding to resonate with a frequency $f$, said magnetic path being in respective cores with respect to magnetic fluxes produced by currents flowing through said exciting coil and said oscillation coil, means to apply a weak input signal to said resonant circuit and having one of two phases, whereby an oscillation signal is induced in said resonant circuit composed of said oscillation winding and said tuning capacitor, said oscillation signal having the frequency $f$ and one of two possible phases which differ by 180° in accordance with the phase of an input weak signal applied to said resonant circuit.

3. A parametron element comprising, a ferromagnetic thin film flat core defining a magnetic path, two hard substrata between which said flat core is held, an exciting winding wound on said two substrata for uniformly exciting the core with a frequency $2f$, said two hard substrata being non-conductive and having, respectively, parallel conductive thin films deposited thereon spaced from one another on the inner sides of said two substrata, said parallel conductive thin film being electrically connected to form an oscillation winding comprising two coils closely wound, respectively, on said core near the center portion of the core so as to have narrow winding widths and connected in series in a reverse sense so that said two windings are decoupled from each other, said exciting winding and said oscillation winding have a same winding axis, a resonance circuit comprising said oscillation winding and a tuning capacitor connected in parallel with the oscillation winding to resonate with a frequency $f$, the magetic path in the core being open with respect to magnetic fluxes produced by currents flowing through said exciting winding and said oscillation winding, means to apply a weak input signal to said resonance circuit, whereby an oscillation signal is induced in said resonance circuit composed of said oscillation winding and said tuning capacitor, and said oscillation signal having a frequency $f$ and one of two possible phases which differ by 180° in accordance with the phase of a weak input signal applied in operation to said resonance circuit.

References Cited

UNITED STATES PATENTS

| | | | |
|---|---|---|---|
| 3,077,586 | 2/1963 | Ford | 340—174 |
| 2,697,178 | 12/1954 | Isborn | 307—88 |
| 2,814,733 | 11/1957 | Lipkin | 307—88 |
| 2,883,604 | 4/1959 | Mirtuner | 307—88 |
| 2,792,563 | 3/1957 | Rajchman | 340—174 |
| 2,945,217 | 7/1960 | Fisher et al. | 340—174 |
| 3,051,891 | 8/1962 | Jorgensen | 307—88 |
| 2,948,818 | 8/1960 | Goto | 307—88 |

FOREIGN PATENTS 854,714 11/1960 Great Britain.

OTHER REFERENCES

Publication I, Journal of Applied Physics, vol. 29, No. 3, March 1958. pp. 264–273.

Publication II, Electronic Design, vol. 7, No. 17, Aug. 19, 1959, pp. 42 and 43.

Publication III, Proceedings of the National Electronics Conference, 1959, pp. 65 to 78.

BERNARD KONICK, *Primary Examiner.*

JAMES W. MOFFITT, *Examiner.*